(12) United States Patent
Sadowski et al.

(10) Patent No.: US 8,799,685 B2
(45) Date of Patent: Aug. 5, 2014

(54) CIRCUITS AND METHODS FOR PROVIDING ADJUSTABLE POWER CONSUMPTION

(75) Inventors: Greg Sadowski, Cambridge, MA (US); Stephen David Presant, San Jose, CA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 259 days.

(21) Appl. No.: 12/868,292

(22) Filed: Aug. 25, 2010

(65) Prior Publication Data

US 2012/0054518 A1  Mar. 1, 2012

(51) Int. Cl.
*G06F 1/00* (2006.01)
*G06T 1/60* (2006.01)
*G09G 5/39* (2006.01)

(52) U.S. Cl.
USPC ........... 713/300; 713/310; 713/320; 713/322; 345/530; 345/531; 345/532

(58) Field of Classification Search
USPC ........... 713/300, 310, 320, 322; 345/530–532
See application file for complete search history.

(56) References Cited

U.S. PATENT DOCUMENTS

| | | | |
|---|---|---|---|
| 4,229,797 A | 10/1980 | Ledley | |
| 4,412,294 A | 10/1983 | Watts et al. | |
| 4,747,074 A | 5/1988 | Yoshida | |
| 4,860,251 A | 8/1989 | Bizjak et al. | |
| 5,398,048 A | 3/1995 | O'Mahony | |
| 5,544,101 A | 8/1996 | Houston | |
| 5,615,355 A | 3/1997 | Wagner | |
| 5,615,376 A | 3/1997 | Ranganathan | |
| 5,675,808 A | 10/1997 | Gulick et al. | |
| 5,729,720 A | 3/1998 | Kau et al. | |
| 5,752,045 A | 5/1998 | Chen | |
| 5,781,496 A | 7/1998 | Pinkham et al. | |
| 5,781,769 A | 7/1998 | Weber | |
| 5,804,749 A | 9/1998 | Shirakawa et al. | |
| 5,835,435 A | 11/1998 | Bogin et al. | |
| 5,907,330 A | 5/1999 | Simmers | |
| 6,002,412 A | 12/1999 | Schinnerer | |
| 6,014,125 A | 1/2000 | Herbert | |
| 6,023,262 A | 2/2000 | Eglit | |
| 6,040,845 A | 3/2000 | Melo et al. | |
| 6,046,738 A | 4/2000 | Eglit et al. | |
| 6,067,071 A | 5/2000 | Kotha et al. | |
| 6,067,083 A | 5/2000 | Glen et al. | |
| 6,073,223 A | 6/2000 | McAllister et al. | |

(Continued)

FOREIGN PATENT DOCUMENTS

EP   0 155 499   9/1985

OTHER PUBLICATIONS

JEDEC Solid State Technology Association, "JEDEC Standard: DDR2 SDRAM Specification," Jan. 2004; JEDEC Solid State Tech. Assoc., Arlington, Virginia.

*Primary Examiner* — Brian Misiura
(74) *Attorney, Agent, or Firm* — Faegre Baker Daniels LLP

(57) ABSTRACT

Circuit and methods provide for adjustable power consumption using a plurality of memory controllers. In one example, a first memory controller has a first power consumption level. A second memory controller has a second power consumption level that differs from the first power consumption level. Memory controller bypass logic is connected to the first and second memory controllers and selects for a memory client at least one of the first and second memory controllers in response to a change in a power conservation condition.

12 Claims, 3 Drawing Sheets

(56) References Cited

U.S. PATENT DOCUMENTS

| | | | |
|---|---|---|---|
| 6,079,022 A | 6/2000 | Young | |
| 6,079,025 A | 6/2000 | Fung | |
| 6,112,310 A | 8/2000 | Jun et al. | |
| 6,130,660 A | 10/2000 | Imsand | |
| 6,151,681 A | 11/2000 | Roden et al. | |
| 6,177,946 B1 | 1/2001 | Sinclair et al. | |
| 6,209,075 B1 | 3/2001 | Lau | |
| 6,212,599 B1 * | 4/2001 | Baweja et al. | 711/106 |
| 6,232,955 B1 | 5/2001 | Guttag et al. | |
| 6,263,448 B1 | 7/2001 | Tsern et al. | |
| 6,292,201 B1 | 9/2001 | Chen et al. | |
| 6,307,281 B1 | 10/2001 | Houston | |
| 6,460,125 B2 | 10/2002 | Lee et al. | |
| 6,657,634 B1 | 12/2003 | Sinclair et al. | |
| 6,820,209 B1 | 11/2004 | Culbert et al. | |
| 6,848,058 B1 * | 1/2005 | Sinclair et al. | 713/322 |
| 6,943,844 B2 | 9/2005 | Cahill, III | |
| 6,950,105 B2 | 9/2005 | Giemborek et al. | |
| 7,000,065 B2 | 2/2006 | Wilcox et al. | |
| 7,007,175 B2 | 2/2006 | Chang et al. | |
| 7,028,200 B2 | 4/2006 | Ma | |
| 7,036,032 B2 | 4/2006 | Mizuyabu et al. | |
| 7,073,082 B2 | 7/2006 | Hsu | |
| 7,093,153 B1 | 8/2006 | Witek et al. | |
| 7,114,086 B2 | 9/2006 | Mizuyabu et al. | |
| 7,315,957 B1 | 1/2008 | Wagner et al. | |
| 7,721,118 B1 * | 5/2010 | Tamasi et al. | 713/300 |
| 7,752,373 B2 * | 7/2010 | Cope | 710/305 |
| 7,827,424 B2 * | 11/2010 | Bounitch | 713/322 |
| 7,898,545 B1 * | 3/2011 | Alben et al. | 345/519 |
| 7,898,547 B2 * | 3/2011 | Wang et al. | 345/532 |
| 8,072,459 B2 * | 12/2011 | Lee et al. | 345/502 |
| 8,230,239 B2 * | 7/2012 | Wang et al. | 713/300 |
| 2001/0012230 A1 | 8/2001 | Takemae et al. | |
| 2003/0128198 A1 | 7/2003 | Mizuyabu et al. | |
| 2003/0210247 A1 | 11/2003 | Cui et al. | |
| 2004/0039954 A1 | 2/2004 | White et al. | |
| 2004/0073824 A1 | 4/2004 | Machida | |
| 2004/0139359 A1 | 7/2004 | Samson et al. | |
| 2004/0236896 A1 | 11/2004 | Kanapathippillai et al. | |
| 2004/0243858 A1 | 12/2004 | Dennis et al. | |
| 2005/0080999 A1 * | 4/2005 | Angsmark et al. | 711/150 |
| 2005/0195181 A1 | 9/2005 | Khodorkovsky | |
| 2005/0289369 A1 | 12/2005 | Chung et al. | |
| 2005/0289377 A1 | 12/2005 | Luong et al. | |
| 2006/0020835 A1 | 1/2006 | Samson et al. | |
| 2006/0026450 A1 | 2/2006 | Bounitch | |
| 2006/0031690 A1 | 2/2006 | Chung et al. | |
| 2006/0187226 A1 | 8/2006 | Bruno et al. | |
| 2006/0248355 A1 * | 11/2006 | Thayer | 713/300 |
| 2006/0259804 A1 | 11/2006 | Fry | |
| 2009/0292934 A1 * | 11/2009 | Esliger | 713/323 |
| 2011/0148923 A1 * | 6/2011 | Sadowski et al. | 345/634 |

* cited by examiner

CIRCUITS AND METHODS FOR PROVIDING ADJUSTABLE POWER CONSUMPTION

FIELD OF THE DISCLOSURE

The present disclosure relates to circuits and methods for providing adjustable power consumption.

BACKGROUND OF THE DISCLOSURE

It is often desirable to reduce the amount of power being consumed by an electronic device such as a desktop PC, laptop PC, camera, cell phone, networked computing device (e.g., a server), tablet (e.g., an Apple® iPad®), video game console, satellite navigation device, personal digital assistant (PDA), etc. Reducing the power consumption of a device is advantageous for several reasons. For example, in a device that has a limited power-source (e.g., a battery-powered device), reducing the amount of power consumed by the device can extend the amount of time that the device can be operated. Additionally, a reduction in power consumption can lower the internal temperature affecting circuitry in the device. As such, the overall size of the device can be reduced because bulky cooling systems can be sized-down or eliminated entirely. Furthermore, reducing the amount of power consumed by a device can lower the operating costs associated with the device (e.g., by reducing the frequency with which batteries need to be replaced).

Accordingly, a number of techniques have been developed for reducing the amount of power consumed by electronic devices. One known technique involves lowering the clock frequency of memory clients associated with the device (as clock frequency is proportional to energy consumption). Another technique involves lowering the core power rail voltage (i.e., the voltage of the processor or memory client). An additional technique utilizes clock branches in the memory controller. This technique involves shutting off different clock branches to reduce the amount of switching or clock gating, thereby lowering power consumption.

However, these conventional techniques suffer from a number of drawbacks. For example, existing electronic devices typically employ a single memory controller that services all memory clients. Because of the complexity involved in servicing a vast number of memory clients, conventional memory controllers typically contain several functional elements including, for example, crossbar switches, arbiters, virtual memory translators, tiling translators, etc. These complex memory controllers are known to consume a great deal of power.

Accordingly, there exists a need for improved circuits and methods for providing adjustable power consumption.

BRIEF DESCRIPTION OF THE DRAWINGS

The disclosure will be more readily understood in view of the following description when accompanied by the below figures and wherein like reference numerals represent like elements, wherein.

DETAILED DESCRIPTION OF THE PREFERRED EMBODIMENTS

Figure 1:
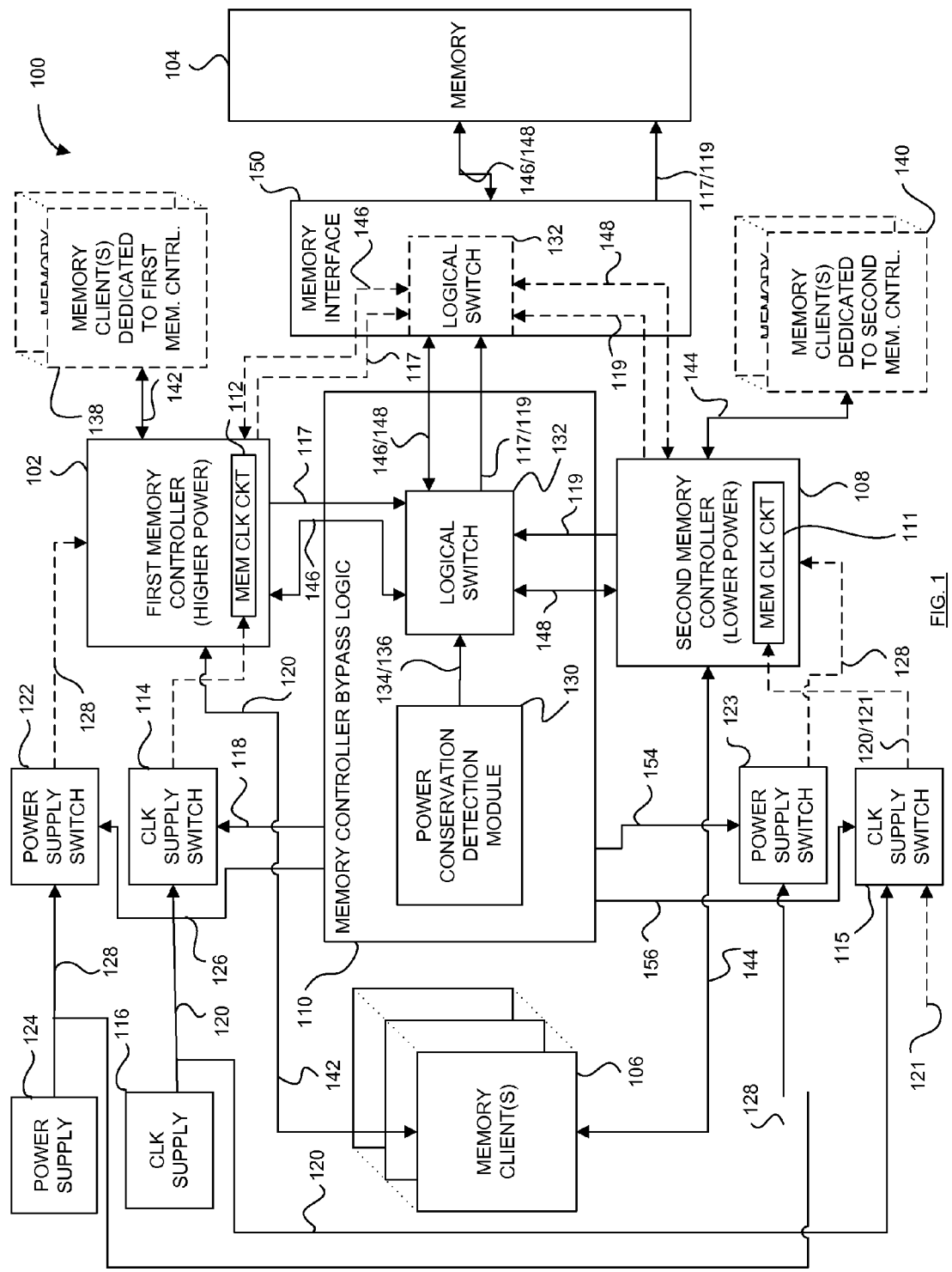
FIG. 1 is a block diagram generally depicting a circuit for providing adjustable power consumption in accordance with one example set forth in the present disclosure.

The present disclosure provides methods and circuits for providing adjustable power consumption using a plurality of memory controllers. In one example, a method for providing adjustable power consumption is disclosed. In this example, the method includes, responsive to a change in a power conservation condition, selecting for a memory client at least one of a first and second memory controller, wherein the first memory controller has a first power consumption level and the second memory controller has a second power consumption level that differs from the first power consumption level.

In one example of the above method, only one of the first and second memory controllers is selected. In this example, the method also includes reducing an amount of power being consumed by the non-selected memory controller. In one example, reducing the amount of power being consumed by the non-selected memory controller includes preventing at least one memory clocking circuit within the non-selected memory controller from receiving a clock signal. In another example where only one of the first and second memory controllers is selected, selecting which memory controller is selected includes generating a logical switch control signal operative to cause a logical switch to block access to memory by the non-selected memory controller and permit access to memory by the selected memory controller.

In another example, there are a plurality of memory clients. In this example, the change in the power conservation condition is detected by determining that fewer than all memory clients need to access memory in order to perform a current operation. In one example, determining that fewer than all memory clients need to access memory in order to perform a current operation includes evaluating a state of an engine that reads or writes to memory.

In another example, the change in the power conservation condition may be detected in a variety of ways. For example, the change in the power conservation condition may be detected by evaluating whether there have been any read or write requests to memory for a period of time. Other ways of detecting the change in the power conservation condition include: evaluating whether graphics are being rendered, evaluating whether there are any updates to display surfaces in memory, evaluating whether video is being played, evaluating whether video is being encoded, or evaluating whether video is being decoded.

Another method for providing adjustable power consumption is also disclosed. This method includes providing access to memory by at least one memory client using a first memory controller having a first power consumption level. Memory access may be switched from the first memory controller to a second memory controller having a second power consumption level that is lower than the first power consumption level. This switching may occur in response to detecting a power conservation condition. Memory is accessed by the same at least one memory client using the second memory controller.

A circuit for providing adjustable power consumption in accordance with the present disclosure is also disclosed. The circuit includes a first memory controller having a first power consumption level and a second memory controller having a second power consumption level that differs from the first power consumption level. The circuit also includes memory controller bypass logic operatively connected to the first and second memory controllers. The memory controller bypass logic selects for a memory client at least one of the first and second memory controller in response to a change in a power conservation condition.

In one example, the memory controller bypass logic is operative to select only one of the first and second memory controllers. In this example, the memory controller bypass logic is further operative to reduce an amount of power being consumed by the non-selected memory controller. In another example, the non-selected memory controller includes a memory clock circuit. In this example, the circuit includes a clock supply switch operatively connected to a clock supply, the memory controller bypass logic, and the memory clock circuit. Here, the memory controller bypass logic is operative to reduce the amount of power being consumed by the non-selected memory controller by generating a clock supply switch control signal operative to cause the clock supply switch to prevent the memory clock circuit from receiving a clock signal from the clock supply.

In one example, the memory controller bypass logic further includes a power conservation detection module operative to detect a change in a power conservation condition. In another example, there are a plurality of memory clients. In this example, the power conservation detection module may detect the change in the power conservation condition by determining that fewer than all memory clients need to access memory in order to perform the current operation. In another example, at least one of the memory clients is an engine and the power conservation detection module may detect the change in the power conservation condition by evaluating a state of an engine (such as, for example, a memory client) that reads or writes to memory.

In another example, the memory controller bypass logic further includes a logical switch operatively connected to the power conservation detection module. In this example, the memory controller bypass logic may select for the memory client only one of the first and second memory controllers. Continuing with this example, the power conservation detection module may generate a logical switch control signal operative to cause the logical switch to block access to memory by the non-selected memory controller and permit access to memory by the selected memory controller.

Another circuit for providing adjustable power consumption is also disclosed. This circuit includes a first memory controller having a first power consumption level. The first memory controller is operative to provide access to memory by at least one memory client. The power adjustment circuit also includes a second memory controller having a second power consumption level that is lower than the first power consumption level. The power adjustment circuit additionally includes memory controller bypass logic operatively connected to the first and second memory controllers. The memory controller bypass logic is operative to switch memory access from the first memory controller to the second memory controller in response to detecting a power conservation condition. The second memory controller is operative to provide access to memory by the same at least one memory client.

Among other advantages, the disclosed circuit and method for providing adjustable power consumption provide a low-power, low-latency memory access path. Specifically, the disclosed circuits and methods provide power savings by reducing the amount of dynamic power and static leakage power being consumed by a non-selected (e.g., first) memory controller. Reducing the amount of power being consumed by the non-selected memory controller facilitates a reduction in the size of the overall electronic device housing the circuit, increases the length of time that the electronic device may be operated without replacing/regenerating a power source, decreases the cost of operating the electronic device, and improves the processing speed of the device during the presence of a power conservation condition. Other advantages will be recognized by those of ordinary skill in the art.

The following description of the embodiments is merely exemplary in nature and is in no way intended to limit the disclosure, its application, or uses. FIG. 1 illustrates one example of a power adjustment circuit 100. As used herein, the term "circuit" or "module" can include an electronic circuit, one or more processors (e.g., shared, dedicated, or group of processors such as but not limited to microprocessors, digital signal processors, or central processing units) and memory that execute one or more software or firmware programs, combinational logic circuits, an application specific integrated circuit, and/or other suitable components that provide the described functionality. The circuit 100 may be contained, for example, within an electronic device such as a desktop PC, laptop PC, camera, cell phone, networked computing device (e.g., a server), tablet (e.g., an Apple® iPad®), video game console, satellite navigation device, personal digital assistant (PDA), or any other suitable electronic device.

Circuit 100 includes a first memory controller 102 having a first power consumption level. The first memory controller 102 may comprise, for example, a microprocessor, microcontroller, digital signal processor(s), or combinations thereof operating under the control of executable instructions stored in storage components. It will also be recognized that instead of a controller that executes instructions, the operations described herein may be implemented in discrete logic, state machines, or any other suitable combination of hardware and software. The first, or higher power, memory controller 102 consumes a relatively high amount of power because it is generally optimized for performance, and not power savings. For example, the first memory controller 102 may include several functional elements such as, for example, crossbar switches, arbiters, virtual memory translators, tiling translators, etc. The inclusion of all of these functional elements leads to a heightened level of power consumption at normal operating voltages.

The first memory controller 102 includes a memory clocking circuit 112 operatively connected to a clock supply switch 114. The memory clocking circuit 112 is operative to produce a memory clock signal 117 based on a reference clock signal 120 and provide the memory clock signal 117 for memory 104. The clock supply switch 114 is operatively connected to a clock supply 116 (e.g., a system clock) over a communication channel such as a suitable bus or buses. The clock supply 116 is operative to produce the reference clock signal 120. The memory clock signal 117 may be the same frequency as the reference clock signal 120, or a different frequency. The first memory controller 102 is also operatively connected to a power supply switch 122 over a communication channel such as a suitable bus or buses. The power supply switch 122 is operative to permit or prevent the first memory controller 102 from receiving a power signal 128 produced by a power supply 124 (e.g., a voltage supply source). While the power supply switch 122 is illustrated as being external to the first memory controller 102, it is envisioned that the power supply switch 122 could equally be integrated into the first memory controller 102 to permit or prevent the first memory controller 102 from receiving a power signal 128 produced by a power supply 124 (e.g., power gating).

Additionally, the first memory controller 102 is operatively connected to one or more memory clients 106 over a communication channel such as a suitable bus or buses. In this manner, the first memory controller 102 is operative to provide access to memory 104 by at least one of the memory clients 106. In this context, providing access to memory 104 means processing a memory request 142 into a form that allows data to be written or read from memory 104. The processed memory request 146 and memory clock signal 117 transmitted from the first memory controller 102 are operative to control the memory interface 150 in order to facilitate the writes or reads requested of memory 104. The processed memory request 146 may be any information indicating that a read or write is requested of memory along with the memory address, for example.

The memory interface 150 is responsible for performing the transactions requested of memory 104. For example, the memory interface 150 orchestrates read/write transactions over the physical wires connecting the elements of circuit 100 to memory 104. As used herein, memory 104 may comprise any combination of volatile/non-volatile memory components such as read-only memory (ROM), random access memory (RAM), dynamic random access memory DRAM, electrically erasable programmable read-only memory (EEPROM), or any other suitable type of memory. Furthermore, memory 104 may comprise system memory, non-system memory (e.g., video memory), memory shared by one or more processors, or any other suitable type of memory as known in the art.

The power adjustment circuit 100 also includes a second memory controller 108 having a second power consumption level that is lower than the power consumption level of the first memory controller 102. The second memory controller 108 may comprise, for example, a microprocessor, microcontroller, digital signal processor(s), or combinations thereof operating under the control of executable instructions stored in storage components. It will also be recognized that instead of a controller that executes instructions, the operations described herein may be implemented in discrete logic, state machines, or any other suitable combination of hardware and software.

The second, or lower power, memory controller 108 consumes a relatively low amount of power because it is generally optimized for power savings and not performance at normal operating voltages. For example, the second memory controller 108 contains far fewer functional elements than the first memory controller 102. In one example, the second memory controller 108 does not include: (1) crossbar switches or (2) virtual to physical address translation circuits. The virtual to physical address translation circuit that is present in the first memory controller 102 but absent in the second memory controller 108 may include, for example, a translation lookaside buffer, or any other suitable virtual to physical address translation circuit known in the art. However, it is recognized that the second memory controller 108 may, in some examples, include some, or most, of the aforementioned functional elements. That is to say, it is not important which particular functional elements are present in the first memory controller 102 and absent in the second memory controller 108. Rather, for the purposes of the present disclosure, it is merely contemplated that the second memory controller 108 will not have all of the functional elements that are present in the first memory controller 102. As such, the second memory controller 108 consumes less power than the first memory controller 102.

The following table illustrates one example of the composition of the first and second memory controllers 102, 108 in an embodiment where the first memory controller 102 provides access to memory 104 by forty (40) memory clients 106, while the second memory controller provides access to memory by a single (1) memory client 106.

TABLE 1

| Functional Elements of Memory Controllers and Memory Interfaces | First (Higher Power) Memory Controller | Second (Lower Power) Memory Controller |
|---|---|---|
| Number of memory clients | 40 | 1 |
| Memory clients' crossbar switches (MCB) with protocol circuits and queues | Included | Not Included |
| Memory clients' request input protocols circuits and queues (including client urgency levels, etc.) | Included | Not Included; request does not need to include the address, as the address can be maintained by a counter circuit inside the second memory controller |
| Memory clients' write data input protocols circuits and storage buffers | Included | Not Included |
| Memory clients' read data return protocols and data buffers | Included | Possibly Included; however, as there is only one client in this example, the read data return buffering is minimal (small) |
| Variety of memory performance counter circuits | Included | Possibly Included; however, as there is only one client in this example, the circuits are small |
| Memory clients' arbitration circuits | Included | Generally included but with simplified arbitration to support single external memory client plus memory refresh |
| Redirection of requests destined to different memory controllers of other memory units | Included | Not Included |
| Memory units address tiling circuits (DRAM banks, pages, columns) | Included | Generally included but simplified as, e.g., an address counter |
| Memory controller's power control circuits (e.g. power gating) | Included | Optionally included, but simpler because the area of this controller is much smaller |

TABLE 1-continued

| Functional Elements of Memory Controllers and Memory Interfaces | First (Higher Power) Memory Controller | Second (Lower Power) Memory Controller |
|---|---|---|
| Virtual to physical address translation circuits with multiple levels of caches | Included | Not Included; addresses are already generated in Physical Address Space |
| SEQuencer: memory PHY circuit(s) operative to translate, e.g., read, write, refresh, and/or training commands from the arbiter into a protocol that is required by the memory interface | Included | Possibly Included; however, interface is running at much slower speed, so much simpler circuits having much smaller area and power consumption can be used; in some cases the secondary memory controller's SEQuencer may only support a sub-set of operations (e.g., read-only), which simplifies the circuit because it is no longer required to support, e.g., write operations |
| High-speed DRAM (or other memory) interface training circuits | Included | Not Included |

The second memory controller 108 includes a memory clocking circuit 111 operatively connected to another clock supply switch 115 over a communication channel such as a suitable bus or buses. The memory clocking circuit 111 is operative to produce a memory clock signal 119 and provide the memory clock signal 119 for memory 104.

In one embodiment (i.e., in the "synchronous mode"), the clock supply switch 115 is operatively connected to the clock supply 116 over a communication channel such as a suitable bus or buses. In this manner, the clock supply switch 115 is operative to permit or prevent the memory clocking circuit 111 of the second memory controller 108 from receiving the reference clock signal 120. This embodiment represents a synchronous mode of operation for the second memory controller 108 because the memory clocking circuit 111 generates the memory clock signal 119 based off of the reference clock signal 120 provided by the clock supply 116. That is to say, in this embodiment, all of the memory client requests 144 are being serviced off of the same clock domain (i.e., based off of the reference clock signal 120). Operating the power adjustment circuit 100 using the second memory controller 108 in a synchronous mode will still realize power savings over operating the power adjustment circuit 100 using the first memory controller 102 because of the higher power consumption of the first memory controller 102. Furthermore, operating the power adjustment circuit 100 using the second memory controller 108 in a synchronous mode can reduce the physical area that the power adjustment circuit 100 occupies.

In another embodiment, the clock supply switch 115 is connected to an asynchronous clock supply (not shown) over a communication channel such as a suitable bus or buses. In this embodiment, the clock supply switch 115 is operative to permit or prevent the memory clocking circuit 111 of the second memory controller 108 from receiving an asynchronous clock signal 121. That is to say, in this embodiment, the asynchronous clock signal 121 is provided to the clock supply switch 115 rather than the reference clock signal 120. The memory clocking circuit 111 of the second memory controller 108 then uses the asynchronous clock signal 121 to generate the memory clock signal 119. Operating the power adjustment circuit 100 using the second memory controller 108 in an asynchronous mode allows for greater power savings than what is realized by operating the power adjustment circuit 100 using the second memory controller 108 in a synchronous mode. This is because, in the asynchronous mode, the clock supply 116 can be completely turned off, thereby conserving a great deal of power. Additionally, in an asynchronous design, there is a greater opportunity to power-off components that are not necessary to perform the current operation (e.g., maintaining a display in a static screen state).

The second memory controller 108 is also operatively connected to a power supply switch 123 over a communication channel such as a suitable bus or buses. The power supply switch 123 is operative to permit or prevent the second memory controller 108 from receiving a power signal 128 produced by a power supply 124 (e.g., a voltage supply source). While the power supply switch 123 is illustrated as being external to the second memory controller 108, it is envisioned that the power supply switch 123 could equally be integrated into the second memory controller 108 to permit or prevent the second memory controller 108 from receiving a power signal 128 produced by a power supply 124 (e.g., power gating). Additionally, the second memory controller 108 is operatively connected to one or more memory clients 106 over a communication channel such as a suitable bus or buses. In this manner, the second memory controller 108 is operative to provide access to memory 104 by at least one of the memory clients 106. For example, the second memory controller 108 is operative to process a memory request 144 into a form that allows data to be written or read from memory 104. The processed memory request 148 and memory clock signal 119 transmitted from the second memory controller 108 are operative to control the memory interface 150 in order to facilitate the writes or reads requested of memory 104 when the second memory controller 108 is operational. The processed memory request 148 may be any information indicating that a read or write is requested of memory along with the memory address, for example.

In one example, the second, or lower power, memory controller 108 controls access to memory 104 by far fewer memory clients 106 (e.g., a single memory client 106) than the first memory controller 102. Accordingly, the second memory controller 108 includes far fewer functional elements in order to process the memory requests 144. For example, in one embodiment, the first memory controller 102 includes memory client crossbar switches with protocol circuits and queues (which are needed because the first memory controller 102 services a plurality of memory clients 106). In one example of this embodiment, the second memory controller 108 only services a single memory client 106. Accordingly, in this embodiment, the second memory controller 108 will not include memory client crossbar switches with protocol circuits and queues. This is because the second memory controller 108 does not need (and thus, does not include) memory client crossbar switches in order to service a single memory client 106.

In another example of an embodiment where the second memory controller only services a single memory client 106 (while the first memory controller 102 services a plurality of memory clients 106), the first memory controller 102 contains virtual to physical address translation circuits with multiple levels of caches. In this example, the second memory controller 108 does not include any virtual to physical address translation circuits because, for example, the memory addresses are already generated by the single memory client 106 in the physical address space.

By reducing the number of functional elements present in the second memory controller 108 relative to the first memory controller 102, power savings can be realized, as discussed in further detail below.

The power adjustment circuit 100 also includes memory controller bypass logic 110. The memory controller bypass logic 110 may comprise, for example, a microprocessor, microcontroller, digital signal processor(s), or combinations thereof operating under the control of executable instructions stored in storage components. It will also be recognized that instead of a controller that executes instructions, the operations described herein may be implemented in discrete logic, state machines, or any other suitable combination of hardware and software.

The memory controller bypass logic 110 is operatively connected to the power supply switches 122, 123 and the clock supply switches 114, 115 over communication channels such as suitable buses. The memory controller bypass logic 110 includes a logical switch 132 and a power conservation detection module 130. The logical switch 132 operatively connects the memory controller bypass logic 110 to the first and second memory controllers 102, 108. The logical switch 132 may be, for example, a distributed multiplexer, such as a distributed multiplexer comprised of AND and OR gates implemented in CMOS technology. However, one having ordinary skill in the art will appreciate that the logical switch 132 may be implemented in a wide variety of different ways in order to achieve the described functionality.

The width of the logical switch 132 will typically be a function of the width of the memory 104. For example, in an embodiment where the memory 104 is 32-bit wide DRAM, the logical switch 132 may be implemented as a distributed multiplexer having, for example, a 32-bit wide data bus. In an example where the logical switch 132 is implemented as a distributed multiplexer, the distributed multiplexer may also contain an address bus and a command bus, such that the switch as a whole is physically wider than 32-bits. Additionally, while the logical switch 132 is illustrated as part of the memory controller bypass logic 110, it is envisioned that the logical switch 132 may also be implemented as part of the first memory controller 102, as part of the second memory controller 108, as part of the memory interface 150, or implemented as the combination of separate parts of the first memory controller 102, second memory controller 108, and/or memory interface 150 (e.g., a portion of the logical switch 132 may be implemented in the first memory controller 102 while the other portion of the logical switch is implemented in the second memory controller 108). For example, FIG. 1 illustrates an alternative embodiment where the logical switch 132 is implemented as part of the memory interface 150.

The logical switch 132 is also operatively connected to the power conservation detection module 130 and the memory interface 150 over a suitable bus or buses. The power conservation detection module 130 may comprise, for example, a microprocessor, microcontroller, digital signal processor(s), or combinations thereof operating under the control of executable instructions stored in storage components. It will also be recognized that instead of a controller that executes instructions, the operations described herein may be implemented in discrete logic, state machines, or any other suitable combination of hardware and software.

The memory controller bypass logic 110 is operative to select for a memory client 106 at least one of the first memory controller 102 and the second memory controller 108 in response to a change in a power conservation condition. That is to say, responsive to a change in a power conservation condition, the memory controller bypass logic 110 is operative to select at least one of the first and/or second memory controllers 102, 108 to provide access to memory 104 by the memory client 106. In one example, the first memory controller 102 may have been providing access to memory 104 for a memory client 106 prior to the detection of a change in a power conservation condition. Following the detection, the memory controller bypass logic 110 may, for example, select the second memory controller 108 to provide access to memory 104 by a memory client 106. That is to say, in this example, the memory controller bypass logic 110 may switch memory access from the first memory controller 102 to the second memory controller 108. Following the selection and switch, in one example, the second memory controller 108 may act as the only memory controller operative to provide access to memory 104 by any memory client(s) 106. The power conservation condition may be detected by the power conservation detection module 130 of the memory controller bypass logic 110, for example.

In one embodiment, the power adjustment circuit 100 additionally includes at least one memory client dedicated to the first memory controller 138 and at least one memory client dedicated to the second memory controller 140. In this embodiment, the memory client(s) dedicated to the first and second memory controllers 138, 140 are operatively connected to the first and second memory controllers 102, 108 via one or more suitable buses. In this manner, the memory client(s) dedicated to the first memory controller 138 only make memory requests 142 of the first memory controller 102. That is to say, the memory client(s) dedicated to the first memory controller 138 only make memory requests 142 of the first memory controller 102, and never make memory requests 144 of the second memory controller 108. Conversely, in this embodiment, the memory client(s) dedicated to the second memory controller 140 only make memory requests 144 of the second memory controller 108, and never make memory requests 142 of the first memory controller 102.

Accordingly, in this embodiment, the first memory controller 102 (having a first power consumption level) is operative to provide access to memory 104 by a memory client dedicated to the first memory controller 138. Also in this embodiment, the second memory controller 108 (having a second power consumption level that is lower than the first power consumption level) is operative to provide access to memory 104 by a memory client dedicated to the second memory controller 140. Further, in this embodiment, the memory controller bypass logic 110 is operative to switch memory access from the first memory controller 102 to the second memory controller 108 in response to detecting a change in a power conservation condition. The power conservation detection module 130 may detect the change in the power conservation condition and the logical switch 132 may carry out the switching. Following the switch, the second memory controller 108 is operative to provide access to memory 104 by memory client(s) dedicated to the second memory controller 140. This embodiment is advantageous because it allows for certain memory clients to be designated as "low-power" memory clients (i.e., memory client(s) dedicated to the second memory controller 140 that may only be provided access to memory 104 by the second memory controller 108).

Figure 2:
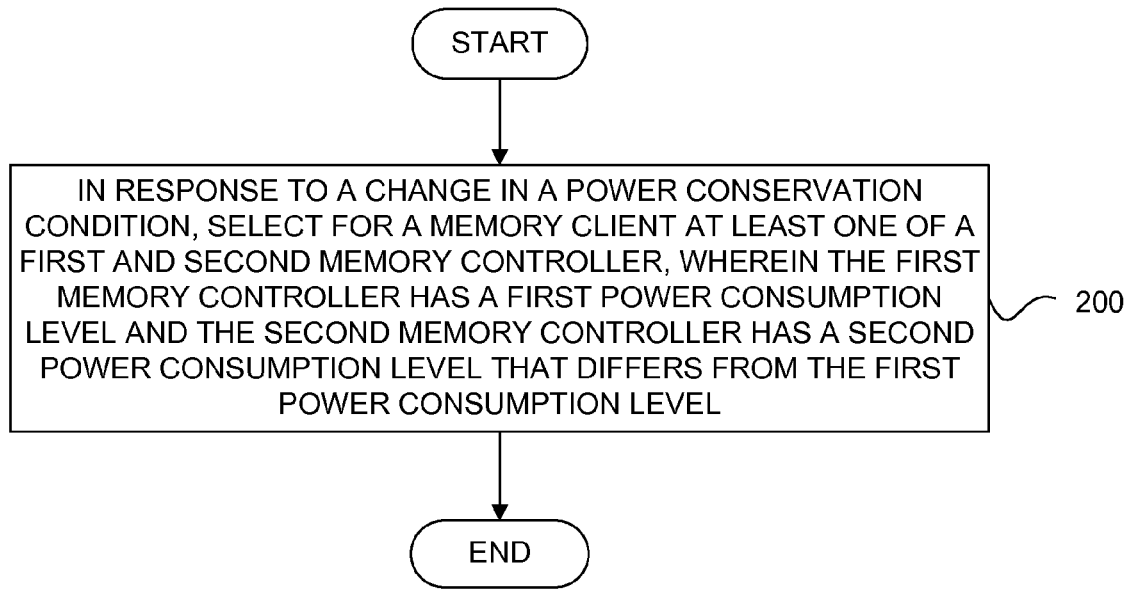
FIG. 2 is a flowchart illustrating one example of a method for providing adjustable power consumption.

FIG. 2 illustrates one example of a method for providing adjustable power consumption. The method may be carried out by the circuit for providing adjustable power consumption 100, or any other suitable circuitry. Specifically, in one example, the method may be carried out by the memory controller bypass logic 110 of the circuit 100 in accordance with its above-described functionality. The method includes, at step 200, responsive to a change in a power conservation condition, selecting for a memory client 106 at least one of a first and second memory controller 102, 108, wherein the first memory controller 102 has a first power consumption level and the second memory controller 108 has a second power consumption level that differs from the first power consumption level. The change in power conservation condition may be detected by the power conservation detection module 130.

In an example where there are a plurality of memory clients 106, the power conservation detection module 130 may detect the change in a power conservation condition by determining that fewer than all of the memory clients 106 need to access memory in order to perform a current operation. This may be done, for example, by the memory controller 102 monitoring which of a plurality of memory clients 106 are attempting to access memory 104 and providing that information to the power conservation detection module 130. This may be done, for example, by evaluating a state of a client engine, such as a 3D engine or any other suitable client 106, that reads or writes to memory 104.

The power conservation detection module 130 may also detect a change in the power conservation condition by, for example, evaluating whether there have been any read or write requests to memory 104 for a period of time. Other techniques for detecting a change in a power conservation condition include, but are not limited to, evaluating whether graphics are being rendered (e.g., by a graphics engine memory client), evaluating whether there are any updates to display surfaces in memory (e.g., an indication of a static screen condition), evaluating whether video is being played or output, evaluating whether video is being encoded, such as by a video encoder, and/or evaluating whether video is being decoded, such as by a video decoder. These evaluations may be made in any suitable manner including evaluating status registers, evaluating bus activity, or in any other suitable manner known in the art.

Figure 3:
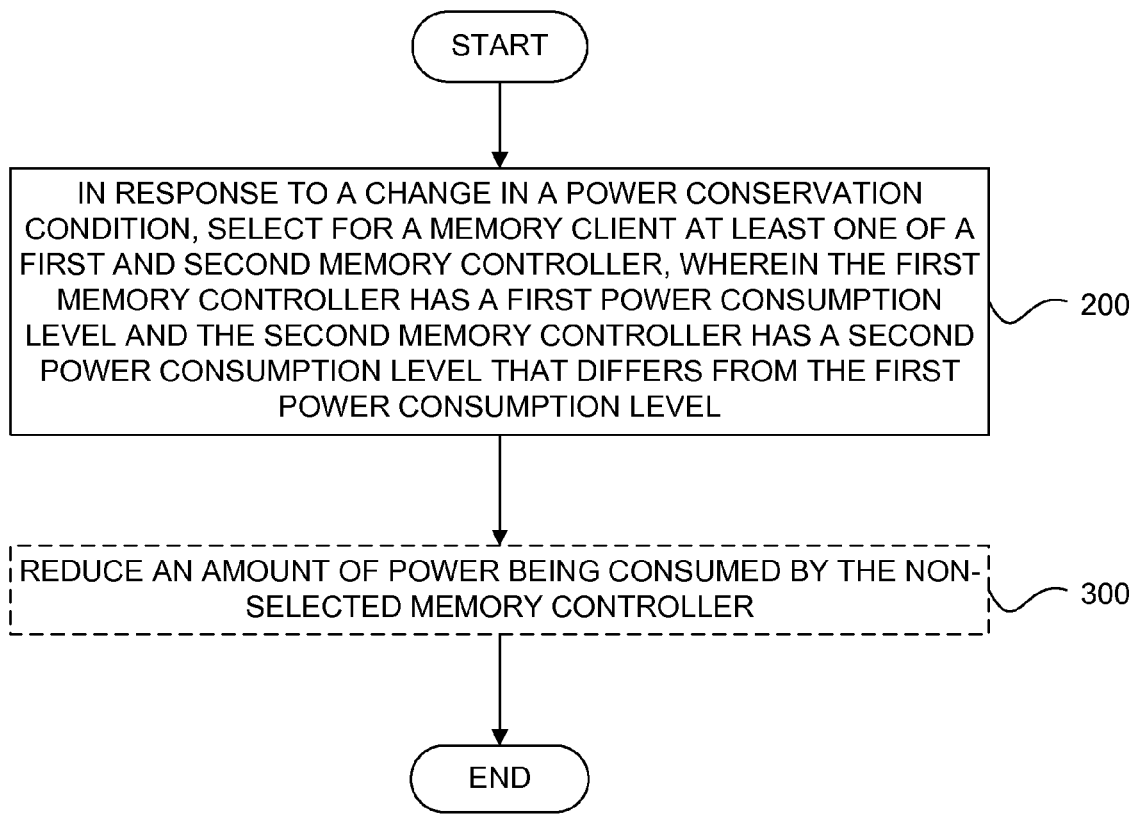
FIG. 3 is a flowchart illustrating another example of a method for providing adjustable power consumption.

FIG. 3 illustrates another example of a method for providing adjustable power consumption wherein only one of the first and second memory controllers 102, 108 is selected for a memory client 106. In this example, the method includes an additional step 300. At step 300, an amount of power being consumed by the non-selected memory controller is reduced.

In one example, the amount of power being consumed by the non-selected memory controller is reduced by preventing a clocking circuit within the non-selected memory controller from receiving a clock signal. For example and with reference to the circuit 100 of FIG. 1, if the first memory controller 102 was the non-selected memory controller following the selection, the amount of power it consumes could be reduced by preventing memory clocking circuit 112 from receiving the clock signal 120. This may be accomplished, for example, by the memory controller bypass logic 110 generating a clock supply switch control signal 118 operative to cause the clock supply switch 114 to prevent the memory clocking circuit 112 from receiving the reference clock signal 120 from the clock supply 116. As discussed in greater detail above, when the circuit 100 is operating using the second memory controller 108 in an asynchronous mode, additional power savings can be realized by turning off the clock supply 116 (e.g., the system clock) entirely such that it is not necessary for the memory controller bypass logic 110 to generate the clock supply switch control signal 118. Preventing at least one memory clocking circuit 112 within the first memory controller 102 from receiving a clock signal 120, or turning off the clock supply 116 altogether, reduces the amount of dynamic power being drawn by the non-selected memory controller, such as the first memory controller 102 in this example.

Of course, if the second memory controller 108 was the non-selected memory controller, it could achieve a reduction in power consumption through a similar application of this method. For example, the amount of power being consumed by the second memory controller 108 (i.e., the non-selected memory controller) may be reduced by preventing the memory clocking circuit 111 from receiving the clock signal 120 (in the synchronous mode) or clock signal 121 (in the asynchronous mode). This may be accomplished, for example, by the memory controller bypass logic 110 generating a clock supply switch control signal 156 operative to cause the clock supply switch 115 to prevent the memory clocking circuit 111 from receiving the reference clock signal 120 or the asynchronous clock signal 121.

In another example, the amount of power being consumed by the non-selected memory controller may be reduced by reducing the amount of power being supplied to the non-selected memory controller from a power supply. For example, if the first memory controller 102 was the non-selected memory controller following the selection, the amount of power it consumes could be reduced by the memory controller bypass logic 110 generating a power supply switch control signal 126 operative to cause the power supply switch 122 to prevent the first memory controller 102 from receiving a power signal 128 from the power supply 124. Reducing the amount of power being supplied to the first memory controller 102 from the power supply 124 reduces the amount of static leakage power being drawn by the memory controller 102 in order to reduce overall circuit 100 power consumption.

Of course, if the second memory controller 108 was the non-selected memory controller, it could achieve a reduction in power consumption through a similar application of this method. For example, if the second memory controller 108 was the non-selected memory controller following the selection, the amount of power it consumes could be reduced by the memory controller bypass logic 110 generating a power supply switch control signal 154 operative to cause the power supply switch 123 to prevent the second memory controller 108 from receiving a power signal 128 from the power supply 124. Reducing the amount of power being supplied to the second memory controller 108 from the power supply 124 reduces the amount of static leakage power being drawn by the memory controller 108 in order to reduce overall circuit 100 power consumption.

Figure 4:
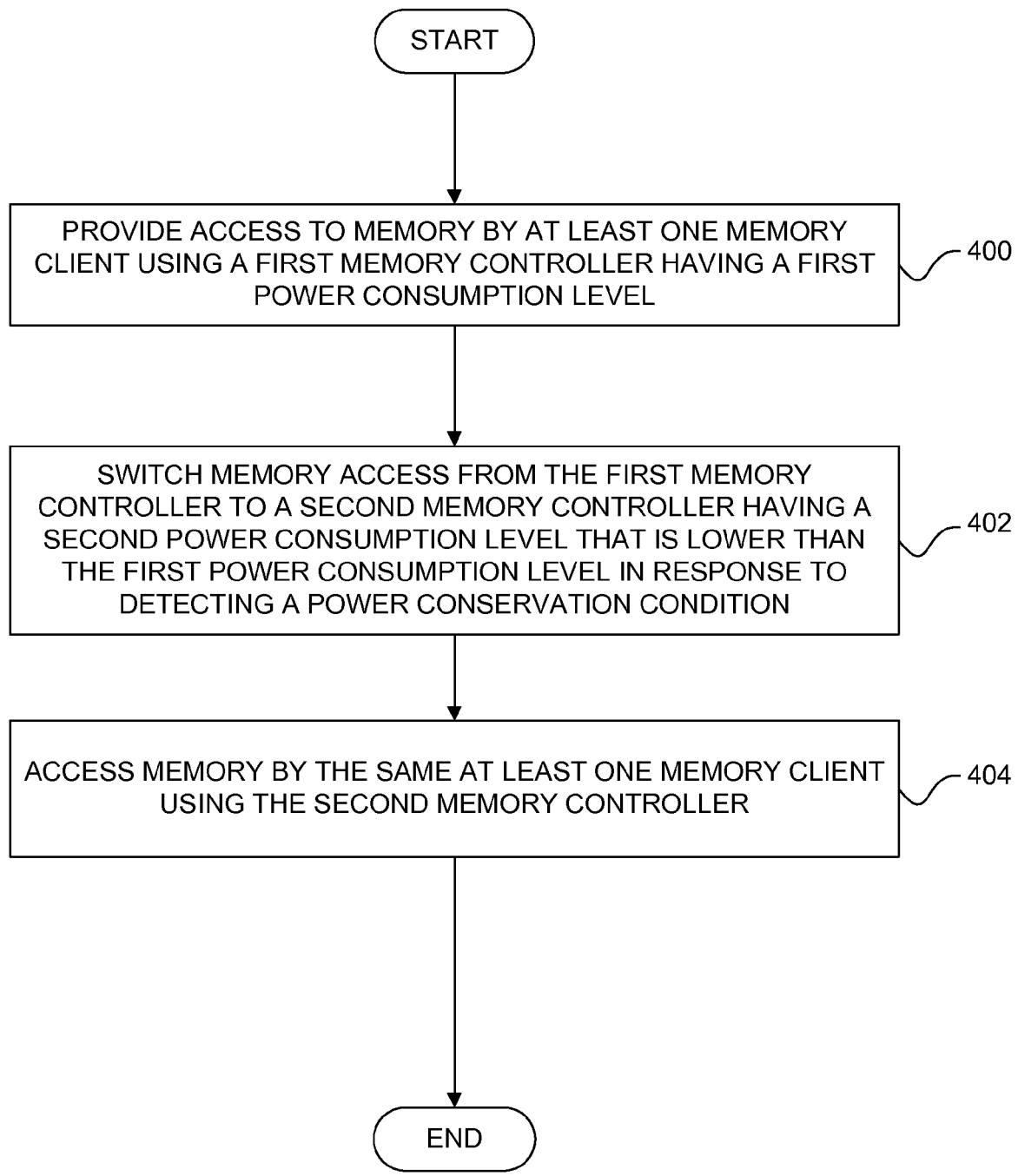
FIG. 4 is a flowchart illustrating yet another example of a method for providing adjustable power consumption.

FIG. 4 illustrates another method for providing adjustable power consumption in accordance with the present disclosure. The method may be carried out by the circuit 100 or any other suitable circuitry. As shown in block 400, the method includes providing access to memory 104 by at least one memory client 106 using, for example, memory controller 102. Memory controller 102 has a first power consumption level. As shown in block 402, the method includes switching memory access from the first memory controller 102 to the second memory controller 108. The second memory controller 108 has a second power consumption level that is lower than the first power consumption level. The switching of the memory access is done in response to detecting a power conservation condition. The power conservation condition may be detected by the power conservation detection module 130 in accordance with any of the techniques described above.

Memory access may be switched from the first memory controller 102 to the second memory controller 108 by, for example, generating a first logical switch control signal 134 operative to cause the logical switch 132 to block access to memory 104 by the first memory controller 102 and permit access to memory 104 by the second memory controller 108.

As shown in block 404, the method also includes accessing memory 104 by the same at least one memory client 106 using the second memory controller 108. The second memory controller 108 has a lower power consumption level than the first memory controller 102, and hence, the method helps reduce power consumption by the circuit 100, since the higher power memory controller 102 is no longer being used.

Among other advantages, the disclosed circuit and method for providing adjustable power consumption provide a low-power, low-latency memory access path. Specifically, the disclosed circuits and methods provide power savings by reducing the amount of dynamic power and static leakage power being consumed by a non-selected (e.g., first) memory controller. Reducing the amount of power being consumed by the non-selected memory controller facilitates a reduction in the size of the overall electronic device housing the circuit, increases the length of time that the electronic device may be operated without replacing/regenerating a power source, decreases the cost of operating the electronic device, and improves the processing speed of the device during the presence of a power conservation condition. Other advantages will be recognized by those of ordinary skill in the art.

Also, integrated circuit design systems (e.g., work stations) are known that create integrated circuits based on executable instructions stored on a computer readable memory such as but not limited to CD-ROM, RAM, other forms of ROM, hard drives, distributed memory, etc. The instructions may be represented by any suitable language such as but not limited to hardware descriptor language or other suitable language. As such, the circuit for providing adjustable power consumption described herein may also be produced as integrated circuits by such systems. For example an integrated circuit may be created using instructions stored on a computer readable medium that when executed cause the integrated circuit design system to create an integrated circuit that is operative to select for a memory client at least one of a first and second memory controller, wherein the first memory controller has a first power consumption level and the second memory controller has a second power consumption level that differs from the first power consumption level in response to a change in a power conservation condition.

The above detailed description and the examples described therein have been presented for the purposes of illustration and description only and not by limitation. It is therefore contemplated that the present disclosure cover any and all modifications, variations or equivalents that fall within the spirit and scope of the basic underlying principles disclosed above and claimed herein.

What is claimed is:

1. A method for providing adjustable power consumption, comprising:
responsive to a change in a power conservation condition, selecting for a memory client at least one of a first and second memory controller,
wherein the first memory controller has a first power consumption level and the second memory controller has a second power consumption level that differs from the first power consumption level,
wherein the change in the power conservation condition is detected by determining that fewer than all memory clients need to access memory in order to perform a current operation, and
wherein determining that fewer than all memory clients need to access memory in order to perform a current operation comprises evaluating a state of an engine that reads or writes to memory.

2. The method of claim 1, wherein only one of the first and second memory controllers is selected, the method further comprising:
reducing an amount of power being consumed by the non-selected memory controller in response to selecting for the memory client at least one of the first and second memory controllers.

3. The method of claim 2, wherein reducing the amount of power being consumed by the non-selected memory controller comprises preventing at least one memory clocking circuit within the non-selected memory controller from receiving a clock signal.

4. The method of claim 1, wherein only one of the first and second memory controllers is selected, and wherein selecting comprises generating a logical switch control signal operative to cause a logical switch to block access to memory by the non-selected memory controller and permit access to memory by the selected memory controller.

5. The method of claim 1, wherein the change in the power conservation condition is detected by at least one of:
evaluating whether there have been any read or write requests to memory for a period of time;
evaluating whether graphics are being rendered;
evaluating whether there are any updates to display surfaces in memory;
evaluating whether video is being played;
evaluating whether video is being encoded; and
evaluating whether video is being decoded.

6. A circuit for providing adjustable power consumption, comprising:
a memory client;
a first memory controller having a first power consumption level;
a second memory controller having a second power consumption level that differs from the first power consumption level; and
memory controller bypass logic operatively connected to the first and second memory controllers, the memory controller bypass logic operative to select for the memory client at least one of the first and second memory controller in response to a change in a power conservation condition,
wherein the memory controller bypass logic is operative to select only one of the first and second memory controllers, and wherein the memory controller bypass logic is further operative to reduce an amount of power being consumed by the non-selected memory controller in response selecting for the memory client at least one of the first and second memory controllers, and
wherein the non-selected memory controller comprises a memory clock circuit, the circuit further comprising:

a clock supply switch operatively connected to a clock supply, the memory controller bypass logic, and the memory clock circuit, wherein the memory controller bypass logic is operative to reduce the amount of power being consumed by the non-selected memory controller by generating a clock supply switch control signal operative to cause the clock supply switch to prevent the memory clock circuit from receiving a clock signal from the clock supply.

7. A circuit for providing adjustable power consumption, comprising:
 a memory client;
 a first memory controller having a first power consumption level;
 a second memory controller having a second power consumption level that differs from the first power consumption level; and
 memory controller bypass logic operatively connected to the first and second memory controllers, the memory controller bypass logic operative to select for the memory client at least one of the first and second memory controller in response to a change in a power conservation condition,
 wherein the memory controller bypass logic further comprises a power conservation detection module operative to detect the change in the power conservation condition,
 wherein the memory client comprises a plurality of memory clients,
 wherein the power conservation detection module is operative to detect the change in the power conservation condition by determining that fewer than all memory clients need access to memory in order to perform a current operation, and
 wherein at least one of the memory clients comprises an engine, and wherein the power conservation detection module is operative to detect the change in the power conservation condition by evaluating a state of an engine that reads or writes to memory.

8. The circuit of claim 7, wherein the memory controller bypass logic further comprises a logical switch operatively connected to the power conservation detection module, wherein the memory controller bypass logic is operative to select for the memory client only one of the first and second memory controllers, and wherein the power conservation detection module is operative to generate a logical switch control signal operative to cause the logical switch to block access to memory by the non-selected memory controller and permit access to memory by the selected memory controller.

9. The circuit of claim 7, wherein the power conservation detection module is operative to detect the change in the power conservation condition by, at least one of:
 evaluating whether there have been any read or write requests to memory for a period of time;
 evaluating whether graphics are being rendered;
 evaluating whether there are any updates to display surfaces in memory;
 evaluating whether video is being played;
 evaluating whether video is being encoded; and
 evaluating whether video is being decoded.

10. A computer readable medium comprising executable instructions that when executed by an integrated circuit fabrication system, cause the integrated circuit fabrication system to produce:
 a memory client;
 a first memory controller having a first power consumption level;
 a second memory controller having a second power consumption level that differs from the first power consumption level; and
 memory controller bypass logic operatively connected to the first and second memory controllers, the memory controller bypass logic operative to select for the memory client at least one of the first and second memory controller in response to a change in a power conservation condition,
 wherein the executable instructions when executed by an integrated circuit fabrication system further cause the integrated circuit fabrication system to produce:
 memory controller bypass logic operative to select only one of the first and second memory controllers and further operative to reduce an amount of power being consumed by the non-selected memory controller,
 the non-selected memory controller comprising a memory clock circuit;
 a clock supply switch operatively connected to a clock supply, the memory controller bypass logic, and the memory clock circuit,
 wherein the memory controller bypass logic is further operative to reduce the amount of power being consumed by the non-selected memory controller by generating a clock supply switch control signal operative to cause the clock supply switch to prevent the memory clock circuit from receiving a clock signal from the clock supply.

11. The computer readable medium of claim 10, wherein the executable instructions when executed by an integrated circuit fabrication system further cause the integrated circuit fabrication system to produce:
 the memory controller bypass logic operative further comprising a power conservation detection module operative to detect the change in the power conservation condition.

12. The computer readable medium of claim 11, wherein the executable instructions when executed by an integrated circuit fabrication system further cause the integrated circuit fabrication system to produce:
 the memory controller bypass logic further comprising a logical switch operatively connected to the power conservation detection module, wherein the memory controller bypass logic is further operative to select for the memory client only one of the first and second memory controllers, and wherein the power conservation detection module is further operative to generate a logical switch control signal operative to cause the logical switch to block access to memory by the non-selected memory controller and permit access to memory by the selected memory controller.

* * * * *